United States Patent [19]

Dore

[11] 4,371,356
[45] Feb. 1, 1983

[54] SLIDING UNIVERSAL JOINTS, PARTICULARLY FOR AUTOMOBILE TRANSMISSIONS

[75] Inventor: Jacques P. Dore, Colombes, France

[73] Assignees: Automobiles Peugeot; Automobiles Citroen S.A., both of Velizy, France

[21] Appl. No.: 138,437

[22] Filed: Apr. 8, 1980

[30] Foreign Application Priority Data

Apr. 12, 1979 [FR] France .................. 79 09277

[51] Int. Cl.³ ............................................. F16D 3/26
[52] U.S. Cl. .................................... 464/111; 464/132
[58] Field of Search ............... 64/21, 8, 7; 464/111, 464/130, 132, 904

[56] References Cited

U.S. PATENT DOCUMENTS

| 942,087 | 12/1909 | Lipe | 64/8 |
|---|---|---|---|
| 1,921,274 | 8/1933 | Warner | 64/8 |
| 2,672,739 | 3/1954 | Wildhaber | 64/21 |
| 3,494,244 | 2/1970 | Wayland | 411/510 |
| 3,613,396 | 10/1971 | Drevard et al. | 64/21 |
| 3,621,676 | 11/1971 | Shachter | 64/21 |
| 4,224,806 | 9/1980 | Kobayashi | 64/21 |

FOREIGN PATENT DOCUMENTS

| 982832 | 3/1949 | France | 64/21 |
|---|---|---|---|
| 546745 | 7/1942 | United Kingdom | 64/21 |

Primary Examiner—Ira S. Lazarus
Assistant Examiner—Magdalen Moy
Attorney, Agent, or Firm—Brisebois & Kruger

[57] ABSTRACT

A sliding universal joint for automobiles having a driving element in the form of socket, connected to a driving shaft and having at least two roller tracks cooperating with rollers mounted by their bores on trunnion pins of a hub connected to a driven shaft. Retainers (11, 21) for retaining the rollers (5) on their trunnion pins (6) are provided with toothed friction surfaces (16, 24) to hold the rollers during manipulation, and against the centrifugal force which occurs during functioning of the joint.

9 Claims, 3 Drawing Figures

SLIDING UNIVERSAL JOINTS, PARTICULARLY FOR AUTOMOBILE TRANSMISSIONS

The invention, due to the efforts of Monsieur Jacques Pierre Dore, relates to sliding universal joints, especially for automobile transmissions, and of the type which has a driving element, basically a socket connected to a driving shaft and having at least two roller tracks or raceways, coacts with rollers mounted by their bores on trunnion pins of a hub connected to a driven shaft.

BACKGROUND OF THE INVENTION

Such joints present difficulties in handling, for example, during mounting or assembly. When there are no retention means for holding the rollers in place on the trunnion pins, problems arise, as in loss of time, due to the rollers escaping from their pins, because of the presence of a bearing or bushing with a low coefficient of friction or an anti-friction coating in the bores of the rollers.

SUMMARY OF THE INVENTION

The object of the invention is primarily to make these universal joints so that they respond better than they presently do to various practical requirements, and particularly so that the above-mentioned disadvantages are eliminated without affecting the efficient functioning of the joint, interfering with assembly, or causing damage to the joint in use.

According to the invention, a universal joint, of the type defined above, is characterized by the fact that it has means for retaining the rollers on their trunnion pins, the retention means being provided with toothed friction surfaces allowing them to be held in place both against the rollers and against the centrifugal force which occurs during operation of the joint.

The retention means can consist of a plastic cap having a head pressing on the trunnion pin, and of a diameter greater than the diameter of the bore of the roller and a stem placed in a cylindrical cavity of the trunnion pin and provided with toothed friction surfaces.

According to another embodiment, the retention means can consist of a flat disc, for example of metal, with a diameter greater than the diameter of the bore of the roller and held pressing against the end of a trunnion pin by a plastic head or cap having a stem placed in a cylindrical cavity of the trunnion pin, and provided with toothed friction surfaces.

Preferably, the above-mentioned friction surfaces consist of a series of teeth in the form of superposed cones whose large bases face toward the head of the cap, and have a diameter slightly greater than the diameter of the cylindrical cavity of the trunnion pin.

According to one preferred embodiment, a bearing sleeve with a low coefficient of friction is attached tightly to the inside of the bore of the roller.

The invention consists, aside from the arrangements discussed above, of certain other arrangements which will be more completely explained below in connection with particular embodiments described with reference to the attached drawings, but which are in no way limiting.

DETAILED DESCRIPTION

Figure 1:
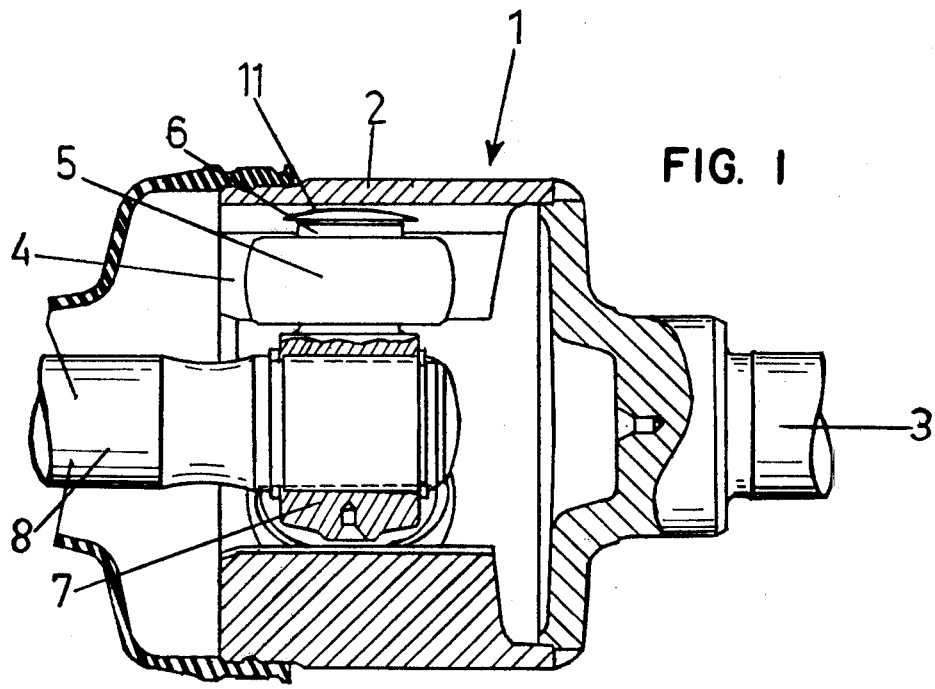
FIG. 1 shows, partly in axial section, a universal joint conforming to the invention.

Referring now to the drawings, and particularly to FIG. 1, there is a universal joint 1, of a tripod or three roller type, for automobile transmissions. This joint has a driving element 2 basically in the form of a socket connected to a driving shaft 3 and having three roller tracks or raceways 4, which are rectilinear, parallel to the axis of socket 2 and regularly spaced at 120°. These roller tracks coact with rollers 5 borne by trunnion pins 6 of a hub or spider 7 connected to a driven shaft 8. In the bore 9 (FIG. 2) rollers 5 can be provided with a pressed in bushing or sleeve 10 with a low coefficient of friction. Retention means 11 for rollers 5 are placed at the end of each of the trunnion pins 6.

Figures 2, 3:
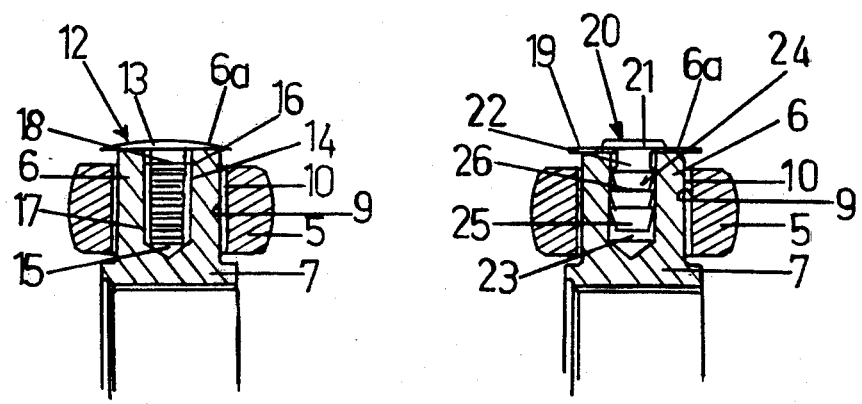
FIG. 2 is a view in section taken along an axis of a trunnion pin of the joint of FIG. 1 to show the ball and retainer in greater detail.
FIG. 3 is a view corresponding to FIG. 2 of another embodiment.

In FIG. 2, one sees a first embodiment of these retention means 11, each of which include a plastic hood or cover 12 having a head 13 pressing on a face 6a of a trunnion pin 6, and of a diameter greater than the interior diameter of low friction sleeve 10, and a shaft or stem 14 placed in a cylindrical cavity 15 of the trunnion pin 6. This stem 14 has a friction surface with teeth 16 allowing the retainer to be held in place on pin 6 against roller 5 during handling and manipulation, and also against displacement from the centrifugal force which occurs during functioning of the joint.

These friction teeth 16 consist of a series of superposed cones 17, whose large base 18, which faces toward the head of the retainer, has a diameter greater than the diameter of the cylindrical cavity 15 of the trunnion pin 6.

FIG. 3 shows a second embodiment of these retention means 11. They consist of a disc 19 for example of metal, of a diameter greater than the interior diameter of low friction bushing 10. This disc 19 is held pressing against the end face 6a of trunnion pin 6 by a plastic hood 20 having a head 21 and a stem 22 placed inside a cylindrical cavity 23 of trunnion pin 6, and provided with friction teeth 24. These friction teeth 24 allow disc 19 and cap 20 to be held in place against displacement of roller 5 during manipulation and handling and against the centrifugal force which occurs during functioning of the joint.

These friction teeth 24 consist of a series of large superposed cones 25 whose large base 26, facing toward head 21 of the retainer, has a diameter greater than the diameter of the cylindrical cavity 23 of trunnion pin 6.

According to another embodiment, not shown, the low friction sleeve 10 can be omitted. There is then provided either an anti-friction coating on the bore of roller 5 or there can be contact of steel on steel. In this case the diameter of plastic cover 12 or of the metallic disc 19 would be greater than the diameter of the bore of roller 5.

By virtue of its construction of plastic material, the retainer can easily be forced into the opening 15 in the pin to provide the required retention. The opening 15 can be a forged opening with rough walls, i.e. it need not be machined, but good gripping of the retainer is assured by its teeth. Further in the event that the retainer comes out, damage to the hard surfaces of the socket or rollers is not likely to be caused by the soft plastic material, or the disc 19 which is preferably a soft metal compared to the metal of the socket on the roller.

Because of the slight clearance between the head 13 of the retainer and the inside of the socket of the joint, the retainer will normally not separate from the pin 6 even if it slips outwardly in opening 15 of the pin 6.

What is claimed is:

1. A sliding universal joint, particularly for automobile transmissions, comprising a driving element essentially in the form of a socket connected to a driving shaft, said socket having at least two roller tracks composed respectively of two cylindrical grooves, at least two rollers of partial spherical curvature mounted by their bores on trunnion pins of a hub connected to a driven shaft, said rollers being axially slidable on said pins and engaging in said tracks, and means for preventing said rollers from sliding off the trunnion pins during assembly of the universal joint, and for permitting said rollers to slide on the trunnion pins after assembly of the joint, said means comprising friction means tightly frictionally gripping each trunnion pin against displacement of the friction means by centrifugal force during rotation of the universal joint and abutment means supported by said friction means in spaced relation to an outside end of each roller, and engageable by the roller, to prevent the roller from sliding off its trunnion pin during assembly of the universal joint.

2. A universal joint according to claim 1 wherein said friction means comprises a retainer having a stem forming a tight friction fit in an axial opening of a trunnion pin and means pressing against an end of a pin for blocking a roller.

3. A universal joint according to claims 1 or 2 wherein said friction means comprises friction tooth means gripping said pin.

4. A universal joint according to claim 2 wherein said pin opening comprises an unmachined rough opening and said stem comprises a friction tooth means tightly gripping said pin opening against displacement of the stem by centrifugal force during rotation of the universal joint.

5. A universal joint according to claim 2 wherein said means pressing against the pin comprises abutment means in the form of a plastic head on said stem of a diameter greater than the diameter of the bore of the roller.

6. A universal joint according to claim 2, wherein the abutment means comprise a flat disc with a diameter greater than the diameter of the bore of the roller and held against the pin by a head of said stem.

7. A universal joint according to claim 3, wherein said friction tooth means comprise a plurality of frustoconical serrations facing toward the end of a pin and tightly gripping the pin.

8. A universal joint according to claim 7 wherein said serrations are compressed radially by the pin.

9. A universal joint according to claim 1 wherein a low friction sleeve is secured in each roller bore and said retaining means blocks the sleeve against axial separation from a pin.

* * * * *